United States Patent
Feichtinger et al.

(10) Patent No.: US 12,494,795 B2
(45) Date of Patent: Dec. 9, 2025

(54) COMMUNICATION DEVICE AND OPERATING METHOD

(71) Applicant: NXP B.V., Eindhoven (NL)

(72) Inventors: Mark Feichtinger, Graz (AT); Johannes Stahl, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 91 days.

(21) Appl. No.: 18/611,022

(22) Filed: Mar. 20, 2024

(65) Prior Publication Data

US 2024/0356558 A1 Oct. 24, 2024

(30) Foreign Application Priority Data

Apr. 18, 2023 (EP) .................................. 23168481

(51) Int. Cl.
| | |
|---|---|
| *H03M 1/12* | (2006.01) |
| *G11B 20/00* | (2006.01) |
| *H04B 1/06* | (2006.01) |
| *H04B 1/10* | (2006.01) |
| *H04B 1/16* | (2006.01) |

(52) U.S. Cl.
CPC ......... *H03M 1/12* (2013.01); *G11B 20/00007* (2013.01); *H04B 1/06* (2013.01); *H04B 1/10* (2013.01); *H04B 1/16* (2013.01)

(58) Field of Classification Search
CPC ..... H03M 1/12; G11B 20/00007; H04B 1/06; H04B 1/10; H04B 1/16
See application file for complete search history.

(56) References Cited

U.S. PATENT DOCUMENTS

| | | |
|---|---|---|
| 5,005,419 A | 4/1991 | O'Donnell et al. |
| 9,118,339 B2 | 8/2015 | Shrivastava et al. |
| 9,136,852 B2 | 9/2015 | Chen et al. |
| 10,794,761 B2 | 10/2020 | Young et al. |
| 11,502,727 B2 | 11/2022 | Stahl et al. |
| 11,757,491 B2 | 9/2023 | Wobak et al. |
| 2007/0063882 A1 | 3/2007 | Feng et al. |
| 2008/0030388 A1 | 2/2008 | Muck et al. |

FOREIGN PATENT DOCUMENTS

EP 2151062 B1 * 4/2016 ........... H03G 3/3078

* cited by examiner

*Primary Examiner* — Joseph J Lauture (57) ABSTRACT

In accordance with a first aspect of the present disclosure, a communication device is provided, comprising: a front-end configured to receive an analog input signal, wherein the front-end comprises an analog-to-digital converter configured to convert the analog input signal into a digital signal; a digital signal processor configured to receive and process said digital signal; wherein the front-end further comprises a compressor operatively coupled to an input of the analog-to-digital converter, wherein said compressor is configured to apply a compressor function to the analog input signal before said analog input signal is provided to the analog-to-digital converter. In accordance with a second aspect of the present disclosure, a corresponding method of operating a communication device is conceived.

20 Claims, 11 Drawing Sheets

COMMUNICATION DEVICE AND OPERATING METHOD

CROSS-REFERENCE TO RELATED APPLICATIONS

This application claims priority under 35 U.S.C. § 119 to European Patent Application No. 23168481.2, filed on Apr. 18, 2023, the contents of which are incorporated by reference herein.

TECHNICAL FIELD

The present disclosure relates to a communication device. Furthermore, the present disclosure relates to a corresponding method of operating a communication device.

BACKGROUND

Radio frequency (RF) communication devices are widely used. Examples of RF communication devices are near field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

SUMMARY

In accordance with a first aspect of the present disclosure, a communication device is provided, comprising: a front-end configured to receive an analog input signal, wherein the front-end comprises an analog-to-digital converter configured to convert the analog input signal into a digital signal; a digital signal processor configured to receive and process said digital signal; wherein the front-end further comprises a compressor operatively coupled to an input of the analog-to-digital converter, wherein said compressor is configured to apply a compressor function to the analog input signal before said analog input signal is provided to the analog-to-digital converter.

In one or more embodiments, the front-end further comprises an expander operatively coupled to an output of the analog-to-digital converter, wherein said expander is configured to apply an expander function to the digital signal provided by said analog-to-digital converter.

In one or more embodiments, the expander function is the inverse of the compressor function.

In one or more embodiments, the expander is operatively coupled to an input of the digital signal processor, and the expander is configured to provide an output of the expander function to said digital signal processor.

In one or more embodiments, the front-end further comprises a shifter coupled between the analog-to-digital converter and the expander, wherein said shifter is configured to perform a left-shift operation on the digital signal provided by said analog-to-digital converter.

In one or more embodiments, the front-end comprises an I-channel and a Q-channel, wherein a first compressor, expander and shifter are included in said I-channel and a second compressor, expander and shifter are included in said Q-channel.

In one or more embodiments, the communication device further comprises a baseband amplifier operatively coupled to an input of the compressor, wherein said baseband amplifier is configured to amplify the analog input signal provided to the compressor.

In one or more embodiments, the communication device further comprises an attenuator operatively coupled to an input of the baseband amplifier, wherein said attenuator is configured to attenuate the analog input signal provided to the baseband amplifier.

In one or more embodiments, the communication device further comprises a mixer and a low-pass filter coupled between the attenuator and the baseband amplifier.

In one or more embodiments, the compressor function is:

$$f(x) = f_{sym}(x) + f_{lin}(x),$$

wherein x denotes the analog input signal, $f_{sym}(x)$ is a symmetric function and $f_{lin}(x)$ is a sum of linear functions.

In one or more embodiments, the communication device is a near field communication (NFC) device.

In one or more embodiments, the communication device is configured for use in one or more of the following modes of operation: a regular NFC mode, a wireless charging mode, a low-power card detection mode, and a robust tag identification mode.

In accordance with a second aspect of the present disclosure, a method of operating a communication device is conceived, comprising: receiving, by a front-end included in the communication device, an analog input signal; applying, by a compressor included in the front-end, a compressor function to said analog input signal; providing, by said compressor, the analog input signal to an analog-to-digital converter included in the front-end after applying the compressor function; converting, by said analog-to-digital converter, the analog input signal into a digital signal; receiving and processing, by a digital signal processor included in the communication device, said digital signal.

In one or more embodiments, the method further comprises applying, by an expander included in the front-end, an expander function to the digital signal provided by the analog-to-digital converter.

In one or more embodiments, the expander function is the inverse of the compressor function.

DESCRIPTION OF DRAWINGS

Embodiments will be described in more detail with reference to the appended drawings.

DESCRIPTION OF EMBODIMENTS

An NFC communication device should able to process signals with different signal strengths and a high dynamic range. In standard NFC communication, the goal is to detect foreign objects at the largest possible distance. Therefore, a small signal is typically amplified with a very high gain. In wireless charging (WLC) applications, the signal strength is much higher as the NFC communication device is communicating with a foreign object at much closer distance. Thus, it should handle a much higher signal strength and less gain is applied. In low power card detection (LPCD) and robust tag identification (RTID) applications, short RF pulses are sent and the corresponding response is analyzed by the NFC communication device. The processing requires a high dynamic range to reliably detect foreign objects in the vicinity of the NFC communication device. It is noted that the term "small signal" refers to a signal having a low amplitude, while the term "large signal" refers to a signal having a high amplitude. At a large distance between a reader and a PICC, the load modulation signal received by the reader has a very low amplitude. Hence, it needs to be amplified. This is the case when a foreign object should be detected. In contrast, for the wireless charging use case, the power receiver is much closer to the reader, which leads to signals having a much higher amplitude, which require less amplification in the receiver.

Figure 1:
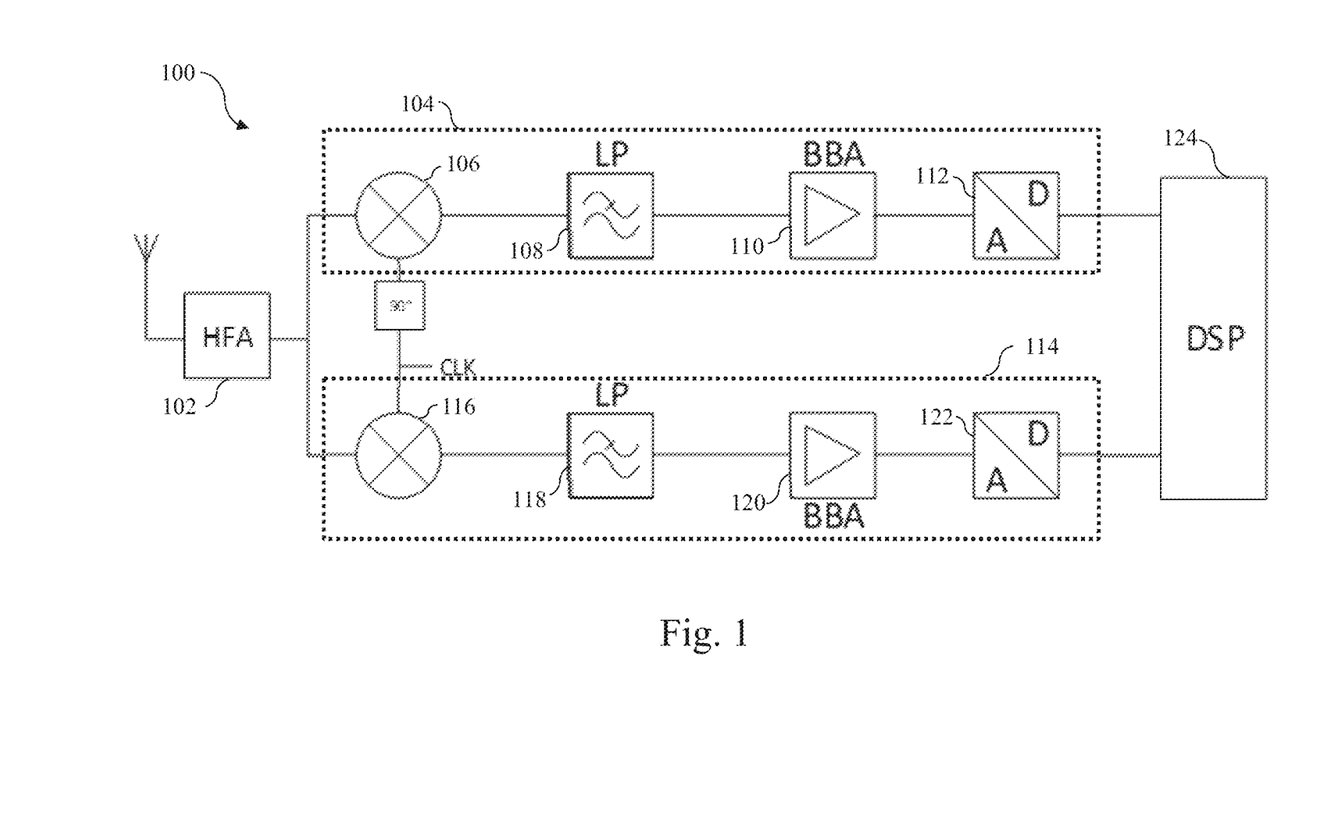
FIG. 1 shows an example of a communication device.

FIG. 1 shows an example of a communication device 100. The communication device 100 comprises a high-frequency attenuator 102, mixers 106, 116, low-pass filters 108, 118, baseband amplifiers 110, 120, analog-digital converters 112, 122, and a digital signal processor 124. More specifically, the communication device 100 comprises an I-channel 104 and a Q-channel 114, each of which contains a mixer 106, 116, low-pass filter 108, 118, baseband amplifier 110, 120, and analog-digital converter (ADC) 112, 122. It is noted that the communication device 100 may contain more components than the ones shown in FIG. 1. In particular, only the components of a receiver block of the communication device 100 are shown.

A typical NFC communication system should be able to operate in at least three different operating modes, which correspond to different use cases. All these use cases have their own challenges which require a very complex regulation to bring the receiver (RX) into a suitable operating point. The signal strength in the receiver depends on the coupling between the NFC reader and the counterpart in the vicinity. FIG. 1 shows a typical RX front-end for an NFC-enabled communication device. To bring the RX signal into a suitable operating point, one can increase the attenuation of the high-frequency attenuator 102, which leads to a smaller RF signal before the mixer 106, 116. Hence, the baseband signal after the mixer 106, 116 is very small and needs to be amplified with the baseband amplifier 110, 120 to have a suitable signal after the analog-to-digital converter 112, 122. The following use cases face different challenges to bring the ADC output signal into a suitable range, i.e. a range which enables easy and reliable decoding. Consequently, a complex regulation loop for the high-frequency attenuator 102 and the baseband amplifier 110, 120 is typically needed.

In a first use case, i.e., standard NFC communication, the device aims at detecting a so-called foreign object at the largest possible distance. Standard NFC communication is defined in, for example, ISO/IEC standard 14443. The system should operate with small signals in the receiver, which are amplified using a high gain. The closer the foreign object is to the NFC communication device, the lower the gain of the receiver needs to be; otherwise the system is out of range and the analog-to-digital converter saturates.

The second use case, i.e. wireless charging (WLC), is a close coupling (i.e., short distance) scenario wherein the RX signals are relatively large compared to standard NFC communication. In several iterations, one can find the ideal RX settings, to cover variations of the input signal. Additionally, in the close coupling scenario in the WLC context, the receiver may suffer from drift effects caused by added direct current (DC). The complex RX regulation to remove the residual DC in the mixer block is not fast enough to cancel this DC drift and the RX signal at the analog-to-digital converter goes out of range. Hence, the challenge is to keep the large RX signal in range of the analog-to-digital converter.

Other use cases are low-power card detection (LPCD) and robust tag identification (RTID). In LPCD and RTID, the NFC-enabled device periodically sends short RF pulses (polls) and analyzes the associated ADC output to detect NFC counterparts in its vicinity. The dynamic range of the system is limited by the ADC. Signals between or shortly after the RF polls are smaller than the least significant bit (LSB) and cannot be detected. However, the large signal during the RF poll may lead to clipping if the gain in the RX is too high and thus may not be detected either.

Summarizing, the various use cases may result in the following challenges. At large distances, the NFC communication device operates with high gain to amplify small signals to achieve high sensitivity. At small distances, large signals in the receiver might lead to clipping and the gain should be reduced. In highly dynamic scenarios, the NFC enabled device should cover both scenarios. This may lead to a very complex regulation loop to steer the receiver into a suitable operating point.

Now discussed are a communication device and a corresponding method of operating a communication device, which facilitate steering a receiver portion of said communication device into a suitable operating point.

Figure 2:
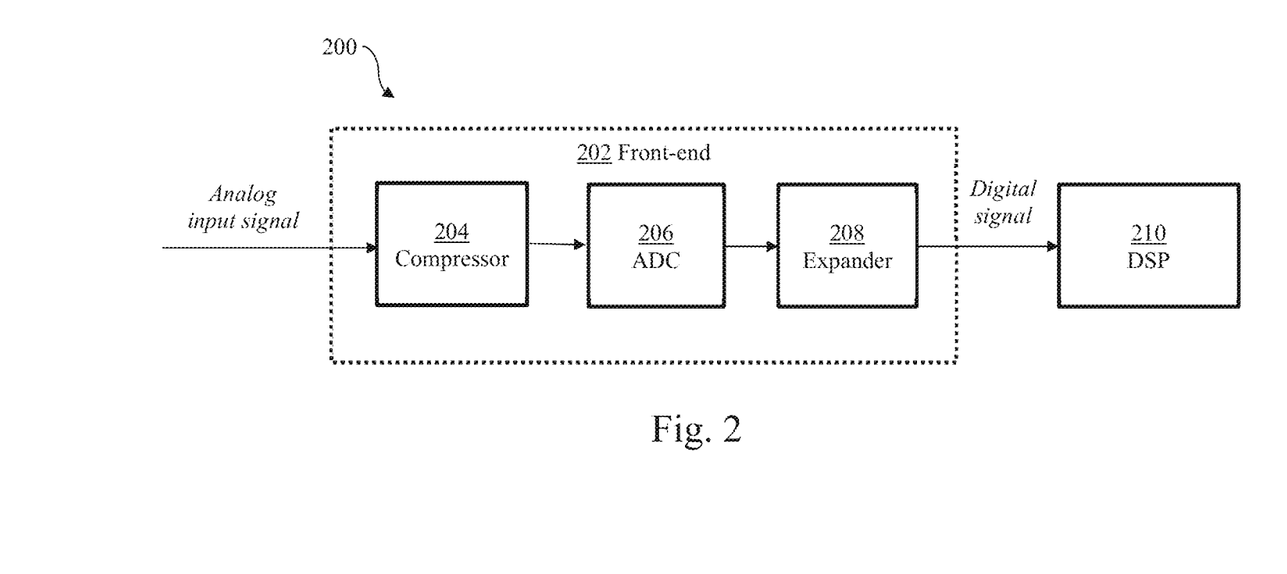
FIG. 2 shows an illustrative embodiment of a communication device.

FIG. 2 shows an illustrative embodiment of a communication device 200. The communication device 200 comprises a front-end 202, for example an analog front-end, and a digital signal processor 210. The front-end 202 comprises a compressor 204, an analog-to-digital converter 206 and an expander 208. The front-end 202 is configured to receive an analog input signal. The analog-to-digital converter 206 is configured to convert this analog input signal into a digital signal. Furthermore, the digital signal processor 208 is configured to receive and process the digital signal. Furthermore, the compressor 204 is configured to apply a compressor function to the analog input signal before said analog input signal is provided to the analog-to-digital converter 206. Furthermore, the expander 208 is configured to apply an expander function to the digital signal provided by said analog-to-digital converter 206. The compression function may enhance small input signals to a larger signal range, and also compress large signals into the operating range of the analog-to-digital converter 206. Thus, the compressor function facilitates extending the dynamic range of a suitable operating point of the communication device 200. More specifically, larger signals than the analog-to-digital converter 206 could normally resolve in the operating point are now in the range of the analog-to-digital converter 206.

In one or more embodiments, the front-end further comprises an expander operatively coupled to an output of the analog-to-digital converter, wherein said expander is configured to apply an expander function to the digital signal provided by said analog-to-digital converter. By using an expander after the analog-to-digital converter, the digital signal may easily be decompressed. This further facilitates steering the receiver portion of the communication device into a suitable operating point. In a practical implementation, the expander function is the inverse of the compressor function. The expander function may for example be implemented as a look-up table, as a piecewise linear function or in software executed by a central processing unit.

In one or more embodiments, the expander is operatively coupled to an input of the digital signal processor, and the expander is configured to provide an output of the expander function to said digital signal processor. In this way, the expander may easily be integrated into a typical receiver architecture. In one or more embodiments, the front-end further comprises a shifter coupled between the analog-to-digital converter and the expander, wherein said shifter is configured to perform a left-shift operation on the digital signal provided by said analog-to-digital converter. By introducing a left-shift operation after the analog-to-digital converter, the gained resolution in the small signal range may be sustained more easily.

In one or more embodiments, the front-end comprises an I-channel and a Q-channel, wherein a first compressor, expander and shifter are included in said I-channel and wherein a second compressor, expander and shifter are included in said Q-channel. Thus, each of the I-channel and the Q-channel may contain a compressor, expander and shifter of the kind set forth. In this way, the compression function may easily be implemented in a typical receiver architecture containing an I-channel and a Q-channel. In one or more embodiments, the communication device further comprises a baseband amplifier operatively coupled to an input of the compressor, wherein said baseband amplifier is configured to amplify the analog input signal provided to the compressor. In this way, the compressor may easily be integrated into a typical receiver architecture.

In a practical implementation, the communication device further comprises an attenuator operatively coupled to an input of the baseband amplifier, wherein said attenuator is configured to attenuate the analog input signal provided to the baseband amplifier. In a further practical implementation, the communication device also comprises a mixer and a low-pass filter coupled between the attenuator and the baseband amplifier.

In a practical implementation, the compressor function is:

$$f(x) = f_{sym}(x) + f_{lin}(x),$$

wherein x denotes the analog input signal, $f_{sym}(x)$ is a symmetric function and $f_{lin}(x)$ is a sum of linear functions.

In one or more embodiments, the communication device is a near field communication (NFC) device. As described above, steering a receiver portion into a suitable operating point may be particularly relevant for NFC-enabled devices. Furthermore, in one or more embodiments, the NFC device is configured for use in one or more of the following modes of operation: a regular NFC mode, a wireless charging mode, a low-power card detection mode, and a robust tag identification mode. As described above, steering a receiver portion into a suitable operating point may be particularly relevant when the NFC device is configured for use in one or more of these modes.

Figure 3:
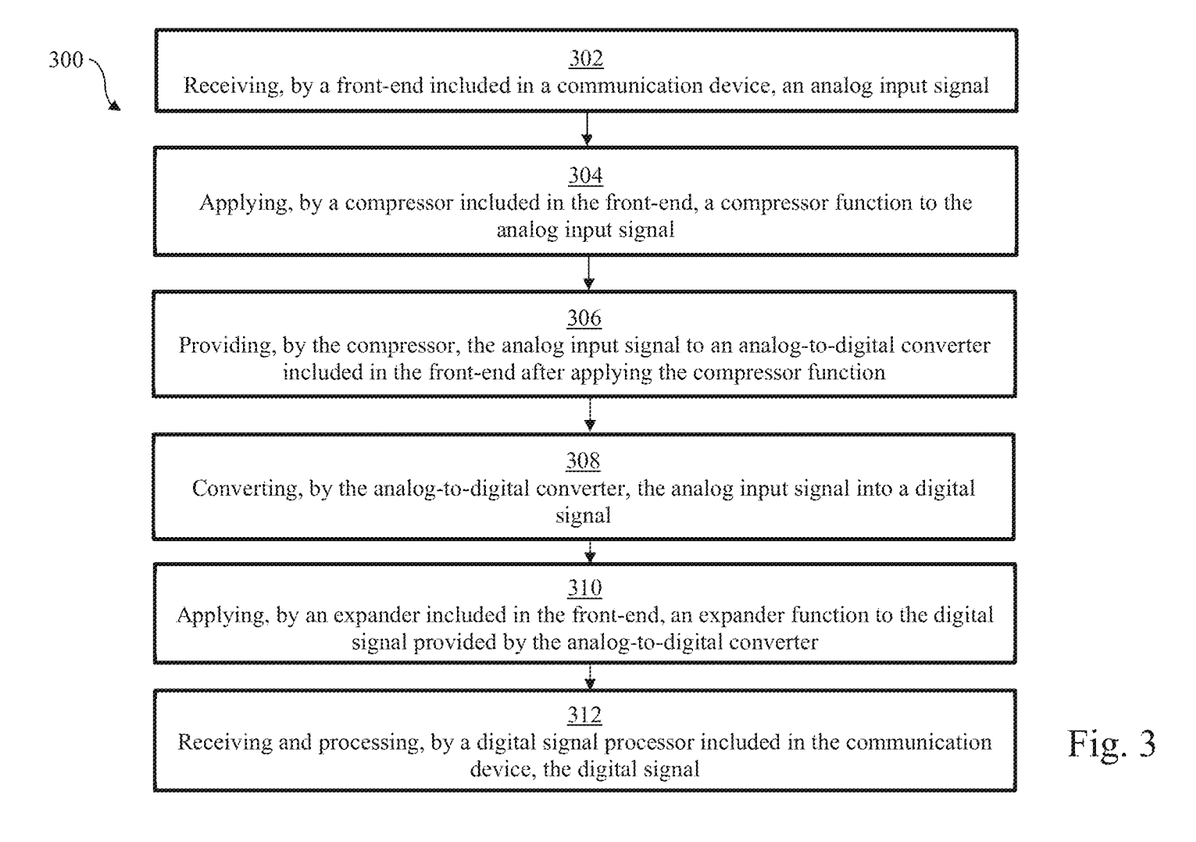
FIG. 3 shows an illustrative embodiment of a method of operating a communication device.

FIG. 3 shows an illustrative embodiment of a method 300 of operating a communication device. The method 300 comprises the following steps. At 302, a front-end included in a communication device receives an analog input signal. At 304, a compressor included in the front-end applies a compressor function to the analog input signal. Furthermore, at 306, the compressor provides the analog input signal to an analog-to-digital converter included in the front-end after applying the compressor function. Furthermore, at 308, the analog-to-digital converter converts the analog input signal into a digital signal. Furthermore, at 310, an expander included in the front-end applies an expander function to the digital signal provided by the analog-to-digital converter. Furthermore, at 312, a digital signal processor included in the communication device receives and processes the digital signal. As mentioned above, the compression function may enhance small input signals to a larger signal range, and also compress large signals into the operating range of the analog-to-digital converter.

Figure 4:
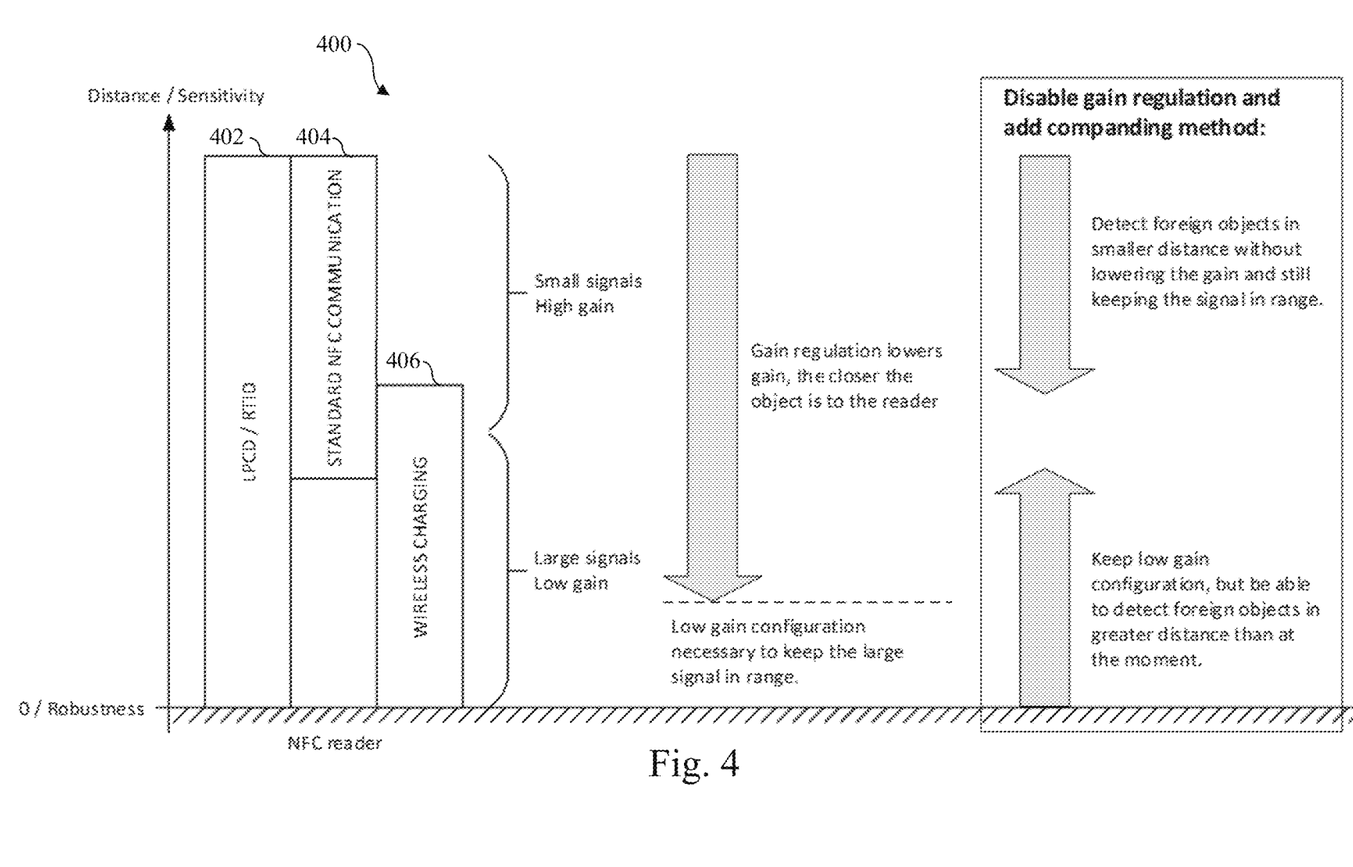
FIG. 4 shows different use case requirements.

FIG. 4 shows different use case requirements 400. As mentioned above, different use cases like LPCD/RTID 402, standard NFC communication 404 and wireless charging 406, may result in various challenges, which in turn may lead to a very complex regulation loop to steer the receiver into a suitable operating point. The presently disclosed communication device and corresponding operating method facilitate steering the receiver into a suitable operating point. In particular, the gain regulation may be disabled and companding may be applied. It is noted that the term "companding" refers to applying a compression function in combination with an expander function. Applying companding to NFC may enable that signals with a large dynamic range are transmitted over devices that have a smaller dynamic range capability. In particular, the following may be achieved: increased robustness in standard NFC communication by seamless signal scaling, avoidance of loss of communication due to ADC clipping caused by large signals in wireless charging by preserving high dynamic range, and an increase of the dynamic range of the receiver in the LPCD/RTID use case without an ADC redesign. For example, by applying companding the signal resolution may be increased to a virtual 12-bit, without the need to redesign an implemented 10-bit linear ADC.

Figure 5:
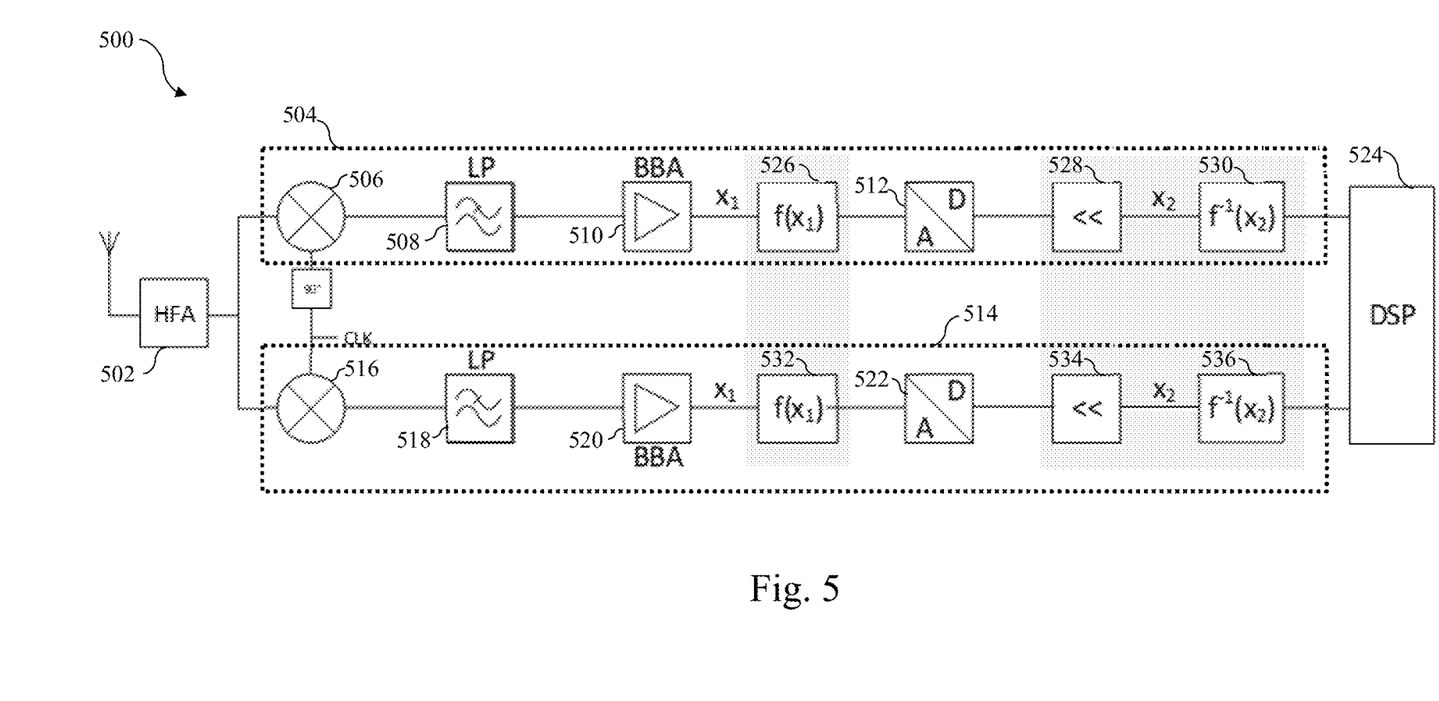
FIG. 5 shows another illustrative embodiment of a communication device.

FIG. 5 shows another illustrative embodiment of a communication device 500. In particular, the communication device 500 is a more detailed, exemplary implementation of the communication device shown in FIG. 2, and forms an extension of the communication device shown in FIG. 1. The communication device 500 comprises a high-frequency attenuator 502, mixers 506, 516, low-pass filters 508, 518, baseband amplifiers 510, 520, analog-digital converters 512, 522, and a digital signal processor 524. More specifically, the communication device 500 comprises an I-channel 504 and a Q-channel 514, each of which contains a mixer 506, 516, low-pass filter 508, 518, baseband amplifier (BBA) 510, 520, and analog-digital converter (ADC) 512, 522. In addition, each of the I-channel 504 and the Q-channel 514 of the communication device 500 comprises a compressor 526, 532, a shifter 528, 534 and an expander 530, 536 of the kind set forth above. It is noted that the communication device 500 may contain more components than the ones shown in FIG. 5. In particular, only the components of a receiver block of the communication device 500 are shown.

In particular, analog input signal after the baseband amplifier 510, 520 is compressed by applying the compressor function $f(x_1)$, where $x_1$ is the output signal of the baseband amplifier 510, 520. The compressed signal is converted into a digital signal using the ADC 512, 522. After a left shift (multiplication by 2n), the expander function $f^{-1}(x_2)$ decompresses the signal, where $x_2$ is the digital signal after the left shift. The compressor function $f(x_1)$ is a combination of a sigmoid function and a linear function as shown in equation (1). It is noted that this compressor function is a specific example of the above-mentioned generic compressor function. Furthermore, based on said generic compressor function, the skilled person may conceive compressor functions which are different from the specific example shown in equation (1). The parameters A(k) and δ(k) of the sigmoid function are related to the compressor output signal range, as the sigmoid should cover the full output signal range. However, they also should let room for the linear function; therefore, they also depend on k. These parameters are explained in more detail below, with reference to FIGS. 6A and 6B.

$$f(x_1) = \frac{A(k)}{1 + e^{-\sigma x}} - \delta(k) + kx \quad \text{Equation (1)}$$

The input and output signal range of the compressor is defined by the maximum BBA output range $V_{BBA\_MAX}$ and the maximal ADC input voltage, which is defined by $V_{ref}$. The ratio between $V_{BBA\_MAX}$ and $V_{ref}$ can be defined as the $\text{Ratio}_{IN/OUT}$. $\text{Ratio}_{IN/OUT}$ influences the slope of the sigmoid and linear function in equation (1).

$$\text{Ratio}_{IN/OUT} = \frac{V_{BBA\_MAX}}{V_{ref}} \quad \text{Equation (2)}$$

For small signals around zero, the high slope of the sigmoid function stretches the signal to cover a larger signal range. Small changes in the BBA output signal are now exceeding 1 LSB of the ADC and can be resolved by it. The slope of the sigmoid function is defined by the parameter σ. SLOPE is a user defined parameter in this example implementation. The higher the value of the parameter SLOPE, the higher is the slope around zero and the higher the effective gain applied to the small signal. Consequently, a smaller range of the compressor input signal is spread over a larger range of the compressor output signal. The definition of σ is shown in equation (3). It is noted that the parameter SLOPE may be the default sigmoid function slope multiplied by a predefined factor.

$$\sigma = \frac{\text{SLOPE}}{\text{Ratio}_{IN/OUT} \cdot V_{BBA\_MAX}} \quad \text{Equation (3)}$$

Large input signals are compressed into a small signal area which is defined by the slope k of the linear part of the compressor function $f(x)$ defined in equation (1). The factor LIN is a user defined parameter in this example implementation. The higher LIN is, the less the large input signals are compressed. In the following simulations, LIN is set to 4 to compress the large signal range into 12.5% of the output signal range. The definition of k is shown in equation (4).

$$k = \frac{1}{\text{Ratio}_{IN/OUT} \cdot LIN} \quad \text{Equation (4)}$$

It is noted that the compressor function shown in equation (1) may be derived as follows. The logistic function shown in equation (5) may be used as the sigmoid function. By adding the parameters σ and δ this sigmoid function may be shifted and transformed to form a relation between +/−$V_{BBA\_MAX}$ and +/−$V_{REF}$, resulting in the function shown in equation (6). This is the function shown as 604 in FIG. 6A. To obtain a slope in the large signal range, the linear function kx (shown as 606 in FIG. 6A) is added, which requires to adjust A and δ, so the addition will lead to the function defined in equation (1) and shown as 602 in FIG. 6A. The factor k is the slope of the linear function and x is the input of the compressor function. To fit the resulting function into the relation between +/−$V_{BBA\_MAX}$ and +/−$V_{REF}$, A(k) should be smaller than A and δ(k) should be different to δ.

$$f(x) = \frac{1}{1 + e^{-x}} \quad \text{Equation (5)}$$

$$f(x) = \frac{A}{1 + e^{-\sigma x}} - \delta \quad \text{Equation (6)}$$

Figure 6A:
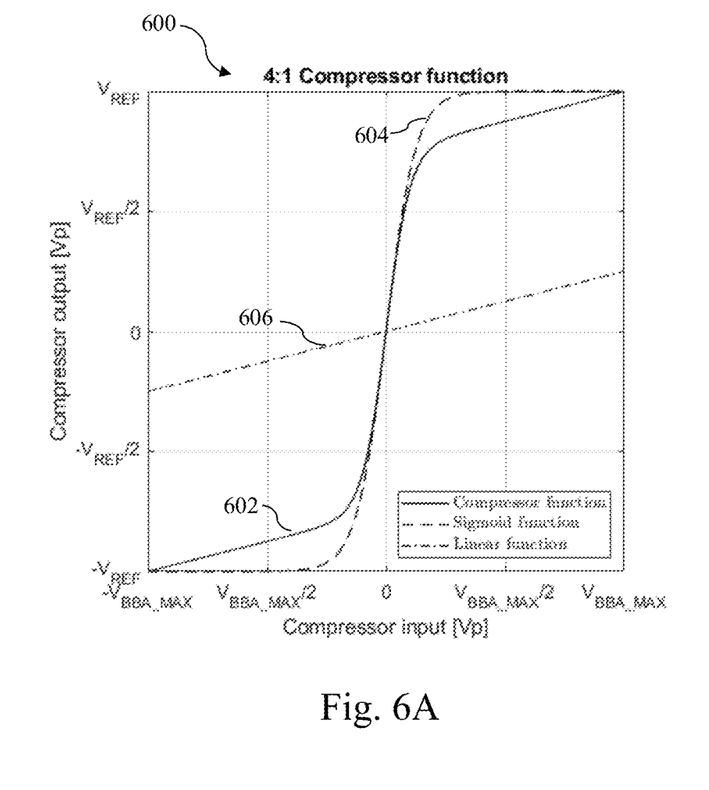
FIG. 6A shows a function applied by a compressor.
Figure 6B:
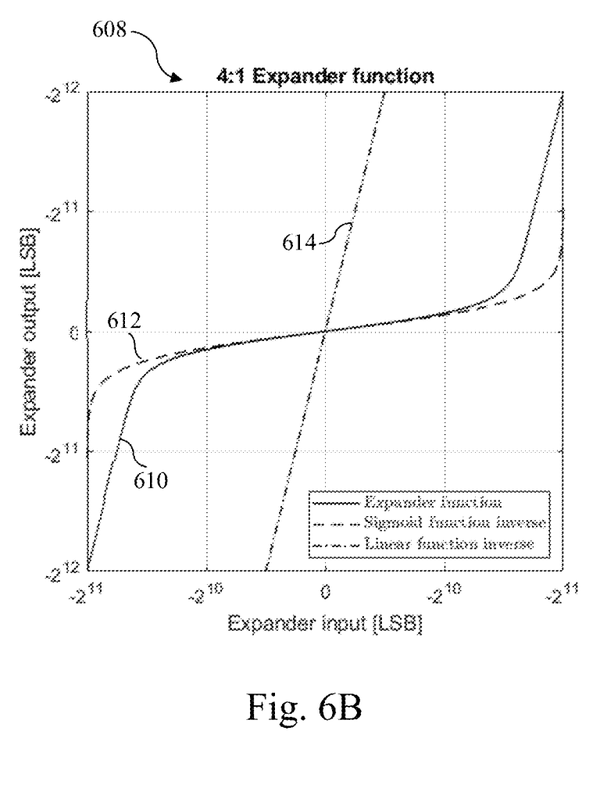
FIG. 6B shows a function applied by an expander.

FIGS. 6A and 6B show a function applied by a compressor, and a function applied by an expander, respectively. In particular, FIG. 6A shows the "4:1" compressor function $f(x)$ 602 and FIG. 6B shows the related expander function $f^{-1}(y)$ 610. The combination of the two functions results in a 12-bit expander output resolution over the whole compressor input voltage range $V_{BBA\_MAX}$. The 12-bit output is a result of two contributors. First, the input to output ratio $\text{Ratio}_{IN/OUT}=2:1$ adds 1 bit of resolution. Second, an additional factor of 2 is related to the slope of the sigmoid function 604. The steepness of the sigmoid function 604 adds 1 bit of resolution around the zero crossing (small signal range) which can be preserved by shifting the ADC output bits to the left before the expander. This is equivalent with a multiplication of 2n where n={0, 1, 2}. In the example implementation, the multiplication actor is equal to the factor SLOPE. Furthermore, to linearize the ADC output, the expander inverts the compression. Consequently, a linear mapping from the BBA output signal to the expander output signal is preserved.

The parameters A(k) and δ(k) of the compressor function are parameters of the sigmoid function, which depend on the linear function kx. The parameter A(k) is the maximum amplitude of the sigmoid function 604. This means that, when the compressor input x is at the maximum ($V_{BBA\_MAX}$), the sigmoid function will have approximately the value of A(k). This needs to be lower than shown in FIG. 6A, as the value of the linear function kx has "to fit" as well. Therefore, the value of A(k)+kx should be approximately $V_{REF}$ for x=$V_{BBA\_MAX}$ and -$V_{REF}$ for x=-$V_{BBA\_MAX}$. The parameter $\delta(k)$ shifts the sigmoid function in the range of -$V_{REF}$ and +$V_{REF}$. The sigmoid function itself, without $\delta(k)$, would be defined between 0 and +2*$V_{REF}$. That means that at compander input x=0, the output value is A(k)/2.

The 4:1 expander function $f^{-1}(y)$ 610 is the inverse of the 4:1 compressor function $f(x)$ 602. The definition of an inverse function is shown in equation (7). In the example implementation, the expander function is implemented as a look-up table (LUT) as no closed analytical form for equation (1) can be found. One can define the expander function $f^{-1}(y)$ 610 as a piecewise linear function to save implementation complexity. However, this would lead to some errors.

$$f^{-1}(f(x)) = x \quad \text{Equation (7)}$$

To derive the LUT for the ideal expander function $f^{-1}(y)$ 610, one should rescale the compressor function to match the input and output range after the ADC. Afterwards, the ideal inverse can be calculated following equation (5). So, a second compressor function may be defined, and the inverse calculated. In that case, the required 1:2 expansion may follow automatically from the 2:1 compressor using the inversion. Table 1 shows the parameters for the example implementation. If not stated differently, simulations in this document are performed for SLOPE=32 and LIN=4 to achieve a 12-bit ADC resolution using a 10-bit linear ADC.

TABLE 1

| | Signal range | Ratio$_{IN/OUT}$ | SLOPE | σ | LIN | k |
|---|---|---|---|---|---|---|
| Compressor | ±0.3 Vp | 2:1 | 32 | 26.66 | 4 | 0.125 |
| Expander | ±2048 LSB | | | | | |

Figure 7:
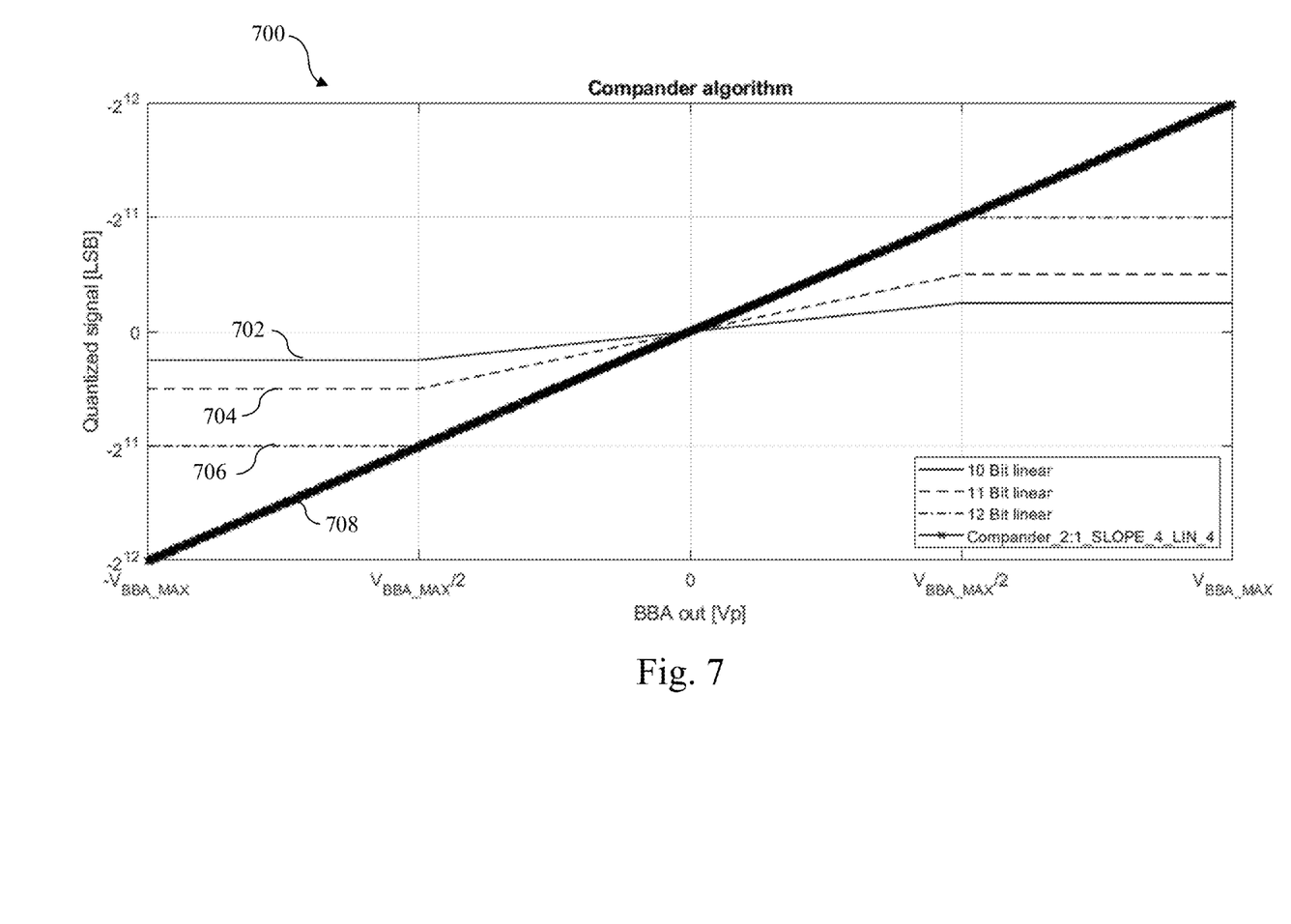
FIG. 7 shows a quantized signal versus a baseband amplifier output for a compander algorithm.

FIG. 7 shows a quantized signal versus a baseband amplifier output 700 for a compander algorithm. In particular, FIG. 7 shows a quantized signal 708 obtained by applying companding to a linear 10-bit ADC in comparison with standalone linear 10/11/12-bit ADCs 702, 704, 706. In typical designs, the ADC only covers signals from -$V_{BBA\_MAX}$/2 to +$V_{BBA\_MAX}$/2. Using a compander, the system can resolve signals exceeding this range and increasing the resolution around the zero crossing. It can be seen that the expander output 708 matches the slope of the 12-bit linear ADC 706.

For the simulation described herein, a simplified demonstrator was implemented to represent the communication device 500 shown in FIG. 5. In the simulation, the compressor and expander function were defined according to Table 1. However, one could easily perform the following simulations with other settings. The communication device in the simulation has a $V_{BBA\_MAX}$ of 0.6 Vp and uses a 10-bit linear ADC with a $V_{ref}$ of 0.3 Vp.

Figure 8A:
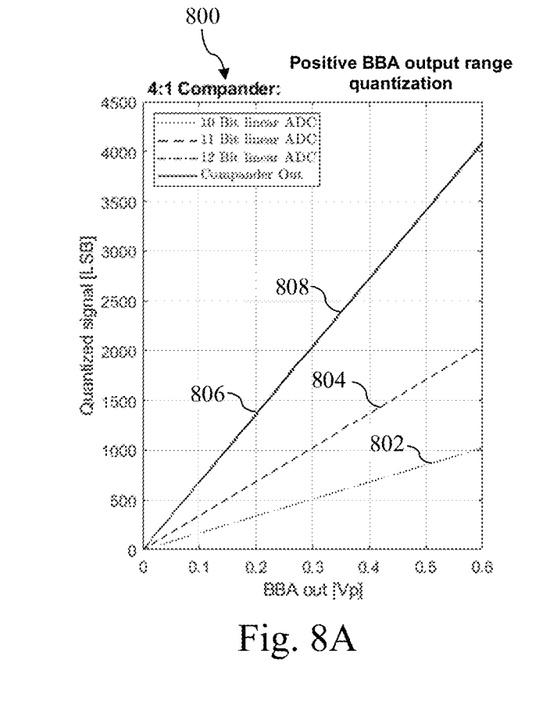
FIG. 8A shows a compander output for a positive BBA output range.
Figure 8B:
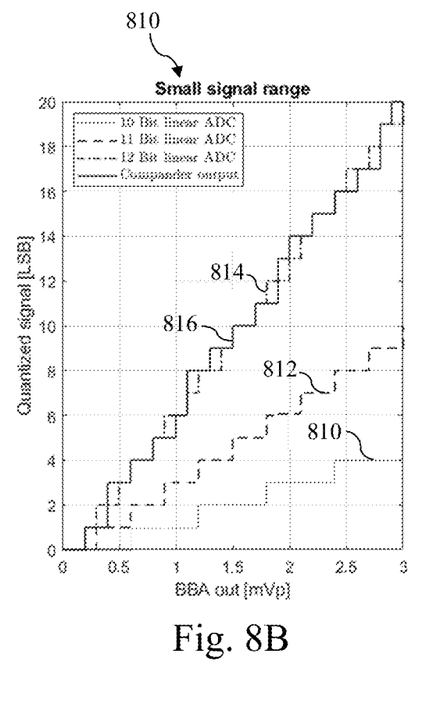
FIG. 8B shows a compander output for a small signal range.
Figure 8C:
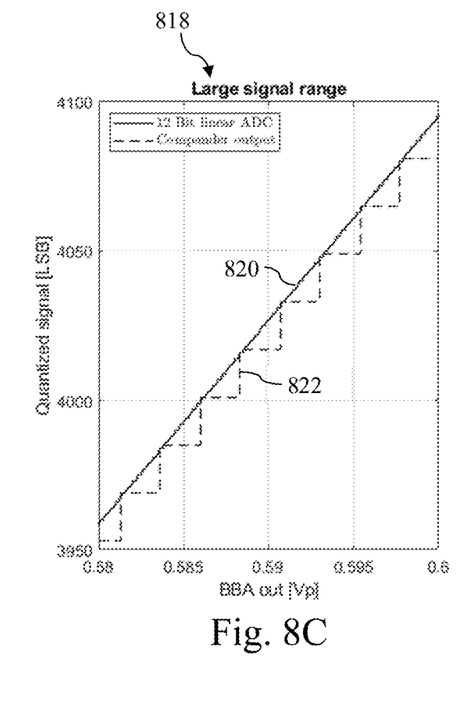
FIG. 8C shows a compander output for a large signal range.

FIGS. 8A, 8B and 8C show a compander output for a positive BBA output range 800, a compander output for a small signal range 810, and a compander output for a large signal range 818, respectively. In particular, the simulation results are shown for a 10/11/12-bit linear ADC as well as the simulation result for a companding method applied to a 10-bit linear ADC. One can see in FIG. 8A, that the slope of the quantized output signal 808 of the compander overlays with the quantized signal 806 of the 12-bit linear ADC, although the companding method uses a 10-bit ADC. FIG. 8B shows a zoom into the small signal range. One can see, that the companding method resolved the BBA output signal 816 with a resolution of a 12-bit linear ADC 814. The standalone 10-bit linear ADC output 810 and the standalone 11-bit linear ADC 812 are shown as well for comparison. For the large signal range shown in FIG. 8C, the results for the 10-bit and 11-bit linear ADCs are not shown, as they saturate at 1024 LSB and 2048 LSB respectively and are out of range. The plot for the large signal range shows the trade-off for the companding method. While for small signals, the compander can resolve the BBA output signal 820 with 12-bit, the resolution for the large signal range is limited by the used 10-bit ADC. However, the compander expands the signal so the slope of the 12-bit ADC is preserved.

Figure 9:
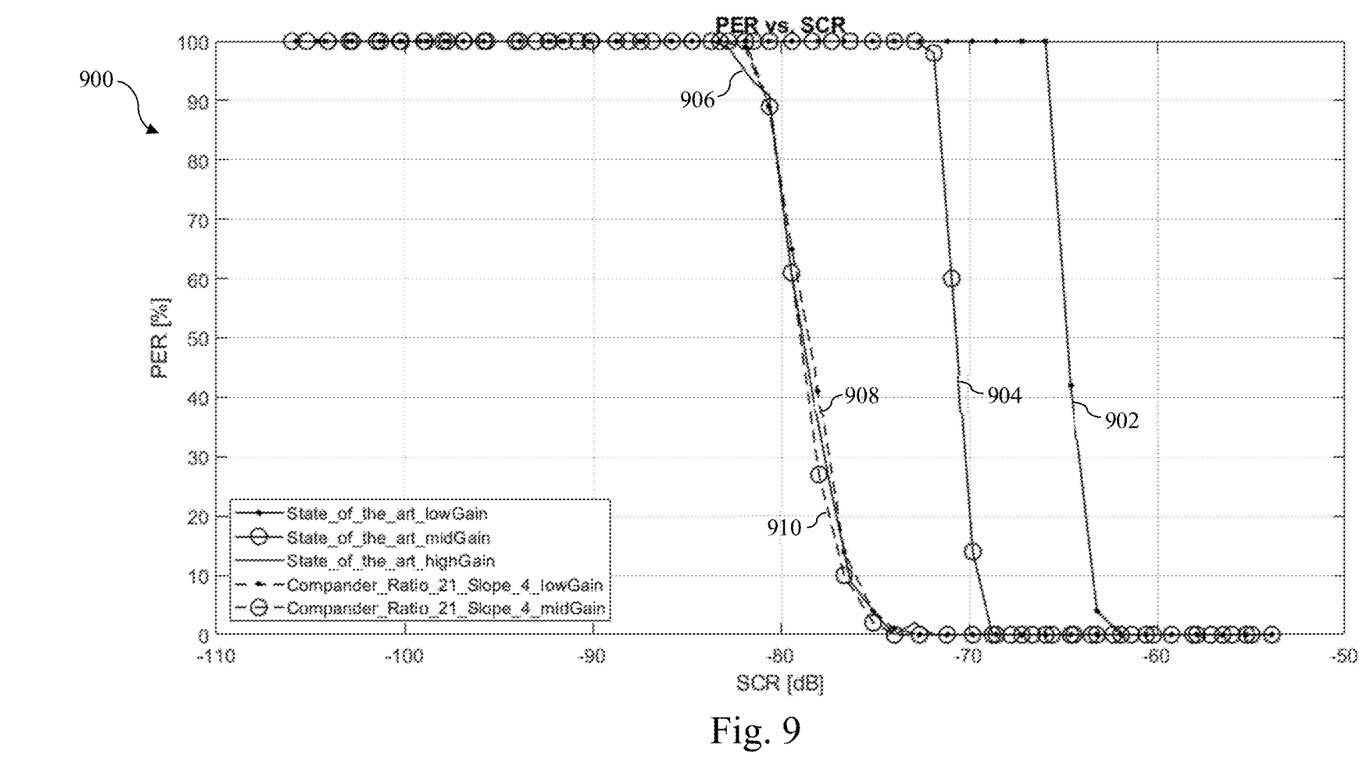
FIG. 9 shows a packet error rate versus signal to carrier ratio for different operating modes.

FIG. 9 shows a packet error rate versus signal to carrier ratio 900 for different operating modes. In particular, simulation results are shown for a standard NFC communication use case. More specifically, FIG. 9 shows a standard NFC communication sensitivity result for a companding method of the kind set forth, compared to state-of-the-art NFC communication systems without a compander. The simulations were performed for fixed BBA gain and no regulation was performed. In the simulation, 100 frames were received, and the packet error rate (PER) was calculated. In NFC communication, the sensitivity is normally reported in terms of signal to carrier ratio (SCR), which is the relation in dB between the continuous carrier signal and the load modulation.

The state-of-the-art high gain simulation is the standard NFC communication case and is used for small signals in far distance. The low BBA gain setting represents the WLC use case. The close coupling scenario requires a low gain, because the signal is very large. However, due to the low gain, the sensitivity is about 14 dB lower than the sensitivity for the high gain scenario. The mid gain scenario represents one gain regulation step, i.e., one increment in the gain regulation loop. Another two gain regulation steps would be required to reach the BBA gain of the high gain scenario. The simulation showed that the system using the companding method and low gain scenario or mid gain scenario can achieve the same sensitivity as the state-of-the-art NFC communication system for a high gain scenario. Therefore, the complex gain regulation can be relaxed, because the foreign object detection can be performed with the same gain scenario as the large signals can be handled in WLC.

Figure 10A:
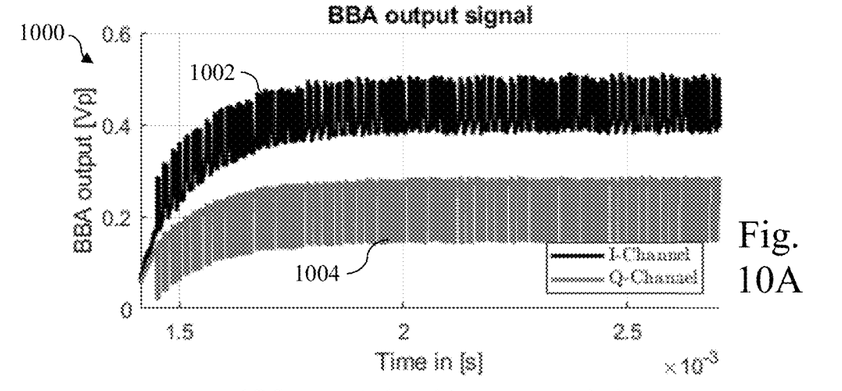
FIG. 10A shows an output signal of a baseband amplifier.
Figure 10B:
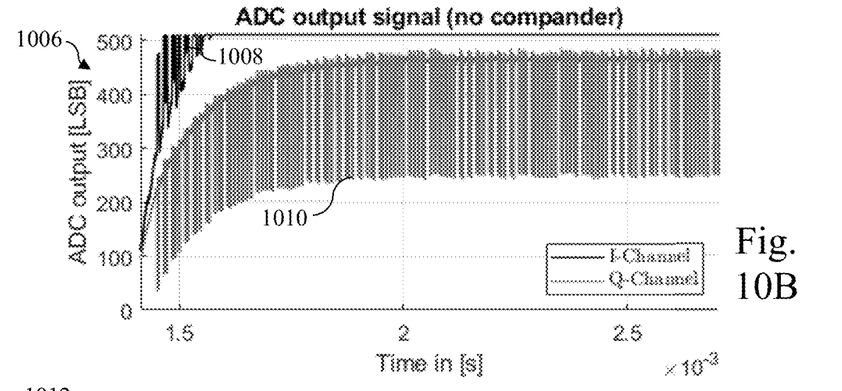
FIG. 10B shows an output signal of an analog-to-digital converter.
Figure 10C:
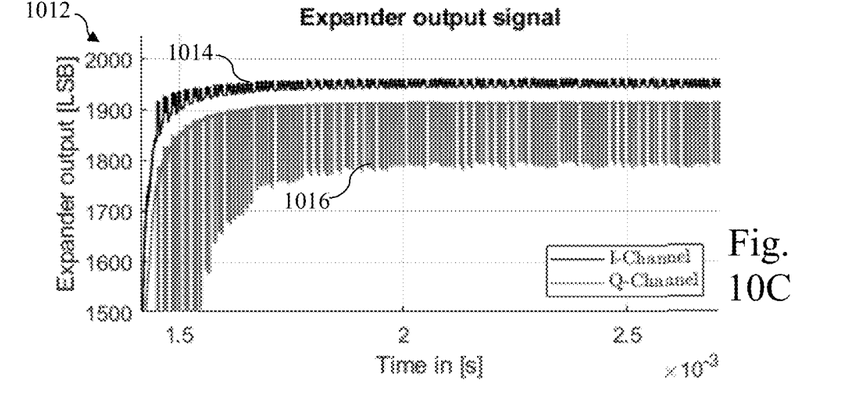
FIG. 10C shows an output signal of an expander.

FIGS. 10A, 10B and 10C show an output signal of a baseband amplifier 1000, an output signal of an analog-to-digital converter 1006, and an output signal of an expander 1012, respectively. In particular, simulation results are shown for a WLC use case. The simulation in FIGS. 10A, 10B and 10C was performed with an exemplary WLC receiver signal. It can be seen that the receiver signal suffers from a drift due to loading effects in the close coupling scenario. Hence, the BBA output signal for the I-channel and the Q-channel are drifting to higher values. The reason is that the operating point of the receiver is drifting away. In this simulation, a compander with SLOPE=2 is used to lower the compression for the large signal range. It can be seen that the BBA output signal 1000 shown in FIG. 10A exceeds the maximum input voltage for the ADC $V_{ref}$ in the used scenario. Consequently, one can see in FIG. 10B that the ADC output signal 1006 is going into clipping for the Q-channel if no compander is used. Compared to this behavior, the expander output 1012 in FIG. 10C shows no clipping. Although the same BBA output signal was applied, the compander can resolve the large signal of the I-channel.

Table 2 sums up the signal level results after the ADC and the expander, respectively. It can be seen that the I-channel is preserved using the companding method. Therefore, it is easier to keep the receiver in range of the ADC and avoid clipping. Furthermore, the optimal receiver configuration is easier to find, and the receiver regulation criteria can be relaxed.

TABLE 2

|  | ADC LMA [LSB] | | |
| --- | --- | --- | --- |
|  | I-Channel | Q-Channel | I + Q-Channel |
| Without compander | 0 | 258 | 258 |
| With compander | 13 | 139 | 152 |
| Difference | +13 | −119 | −106 |

Figure 11A:
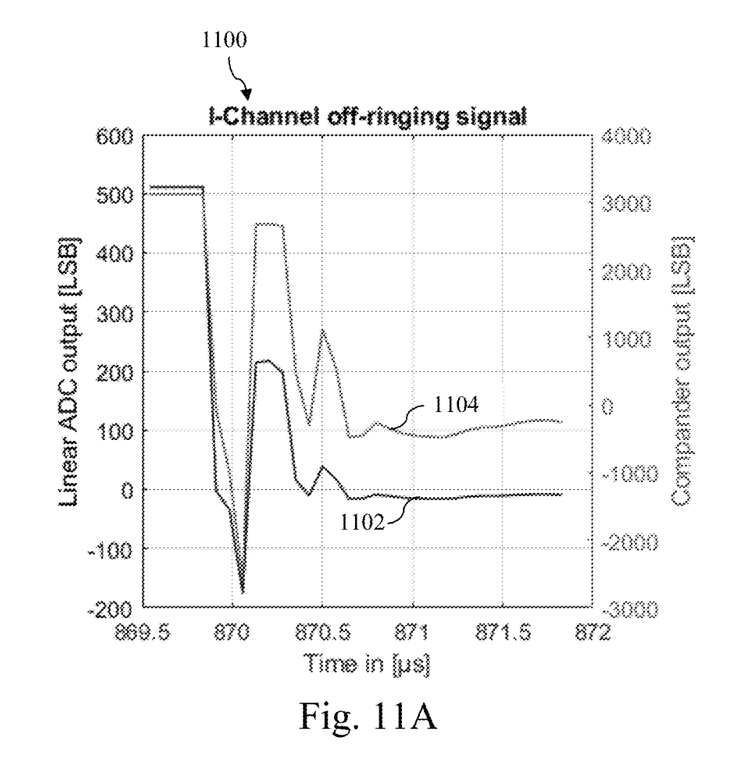
FIG. 11A shows off-ringing signals in an I-channel.
Figure 11B:
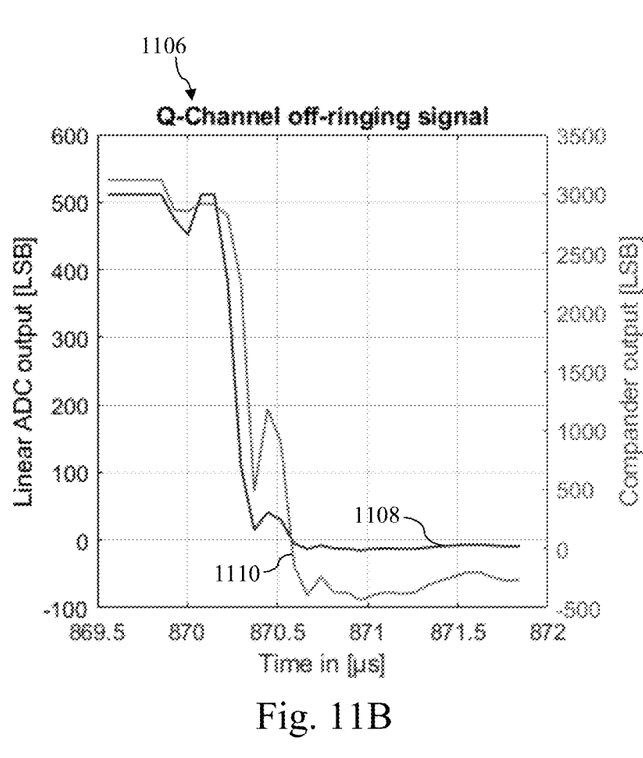
FIG. 11B shows off-ringing signals in a Q-channel.

FIGS. 11A and 11B show off-ringing signals in an I-channel 1100 and off-ringing signals in a Q-channel 1106, respectively. In particular, simulation results are shown for an RTID use case. In RTID, the decaying signal after a short RF pulse is analyzed. This signal is called the off-ringing signal. Shortly before the RF field is turned off, the receiver is reconfigured to bring the off-ringing signal into range. Naturally, this type of signal requires a high dynamic range since the early decay signal is characterized by higher signal amplitudes while the later part of the decay is a very small ringing signal. By applying a companding method, this later decay of the off-ringing signal can be enhanced while the early decay signal is also preserved without saturation. Consequently, the feature extraction is enhanced. FIGS. 11A and 11B show an exemplary off-ringing signal with and without applying the companding method. The compander output signal range is four times higher than the linear ADC output range. Furthermore, small signal changes after 870 µs, not visible in the linear ADC output signal, are enhanced.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication device
102 high-frequency attenuator
104 I-channel
106 mixer
108 low-pass filter
110 baseband amplifier
112 analog-to-digital converter
114 Q-channel
116 mixer
118 low-pass filter
120 baseband amplifier
122 analog-to-digital converter
124 digital signal processor
200 communication device
202 front-end
204 compressor
206 analog-to-digital converter
208 expander
210 digital signal processor
300 method of operating a communication device
302 receiving, by a front-end included in a communication device, an analog input signal
304 applying, by a compressor included in the front-end, a compressor function to the analog input signal
306 providing, by the compressor, the analog input signal to an analog-to-digital converter included in the front-end after applying the compressor function
308 converting, by the analog-to-digital converter, the analog input signal into a digital signal
310 applying, by an expander included in the front-end, an expander function to the digital signal provided by the analog-to-digital converter
312 receiving and processing, by a digital signal processor included in the communication device, the digital signal
400 use case requirements
402 LPCD/RTID
404 standard NFC communication
406 wireless charging 500 communication device
502 high-frequency attenuator
504 I-channel
506 mixer
508 low-pass filter
510 baseband amplifier
512 analog-to-digital converter
514 Q-channel
516 mixer
518 low-pass filter
520 baseband amplifier
522 analog-to-digital converter
524 digital signal processor
526 compressor
528 shifter
530 expander
532 compressor
534 shifter
536 expander
600 function applied by compressor
602 compressor function
604 sigmoid function
606 linear function
608 function applied by expander
610 expander function
612 sigmoid function inverse
614 linear function inverse
700 compander algorithm
702 10-bit linear
704 11-bit linear
706 12-bit linear
708 compander_2:1_SLOPE_4_LIN_4
800 compander output for a positive BBA output range range
802 10-bit linear ADC
804 11-bit linear ADC
806 12-bit linear ADC
808 compander output
810 compander output for a small signal range
812 10-bit linear ADC
814 11-bit linear ADC
816 12-bit linear ADC
818 compander output for a large signal range
820 12-bit linear ADC
822 compander output
900 packet error rate versus signal to carrier ratio
902 state_of_the_art_lowGain
904 state_of_the_art_midGain
906 state_of_the_art_highGain
908 compander_ratio_21_slope_4_lowGain
910 compander_ratio_21_slope_4_modGain
1000 BBA output signal
1002 I-channel
1004 Q-channel
1006 ADC output signal
1008 I-channel
1010 Q-channel
1012 expander output signal
1014 I-channel
1016 Q-channel
1100 I-channel off-ringing signal
1102 linear ADC output
1104 compander output
1106 Q-channel off-ringing signal
1108 linear ADC output
1110 compander output

The invention claimed is:

1. A communication device, comprising:
a front-end configured to receive an analog input signal, wherein the front-end comprises an analog-to-digital converter configured to convert the analog input signal into a digital signal; and
a digital signal processor configured to receive and process said digital signal;
wherein the front-end further comprises a compressor operatively coupled to an input of the analog-to-digital converter, wherein said compressor is configured to apply a compressor function to the analog input signal before said analog input signal is provided to the analog-to-digital converter.

2. The communication device of claim 1, wherein the front-end further comprises an expander operatively coupled to an output of the analog-to-digital converter, and wherein said expander is configured to apply an expander function to the digital signal provided by said analog-to-digital converter.

3. The communication device of claim 2, wherein the expander function is the inverse of the compressor function.

4. The communication device of claim 2, wherein the expander is operatively coupled to an input of the digital signal processor, and wherein the expander is configured to provide an output of the expander function to said digital signal processor.

5. The communication device of claim 2, wherein the front-end comprises an I-channel and a Q-channel, and wherein a first compressor, expander and shifter are included in said I-channel and a second compressor, expander and shifter are included in said Q-channel.

6. The communication device of claim 1, wherein the front-end further comprises a shifter coupled between the analog-to-digital converter and the expander, wherein said shifter is configured to perform a left-shift operation on the digital signal provided by said analog-to-digital converter.

7. The communication device of claim 1, further comprising a baseband amplifier operatively coupled to an input of the compressor, wherein said baseband amplifier is configured to amplify the analog input signal provided to the compressor.

8. The communication device of claim 7, further comprising an attenuator operatively coupled to an input of the baseband amplifier, wherein said attenuator is configured to attenuate the analog input signal provided to the baseband amplifier.

9. The communication device of claim 8, further comprising a mixer and a low-pass filter coupled between the attenuator and the baseband amplifier.

10. The communication device of claim 1, wherein the compressor function is:

$$f(x) = f_{sym}(x) + f_{lin}(x),$$

wherein x denotes the analog input signal, $f_{sym}(x)$ is a symmetric function and $f_{lin}(x)$ is a sum of linear functions.

11. The communication device of claim 1, wherein the communication device is a near field communication, NFC, device.

12. The communication device of claim 11, wherein the communication device is configured for use in one or more of the following modes of operation: a regular NFC mode, a wireless charging mode, a low-power card detection mode, and a robust tag identification mode.

13. A method of operating a communication device, comprising:
    receiving, by a front-end included in the communication device, an analog input signal;
    applying, by a compressor included in the front-end, a compressor function to said analog input signal;
    providing, by said compressor, the analog input signal to an analog-to-digital converter included in the front-end after applying the compressor function; and converting, by said analog-to-digital converter, the analog input signal into a digital signal;
    receiving and processing, by a digital signal processor included in the communication device, said digital signal.

14. The method of claim 13, further comprising applying, by an expander included in the front-end, an expander function to the digital signal provided by the analog-to-digital converter.

15. The method of claim 14, wherein the expander function is the inverse of the compressor function.

16. The method of claim 14, wherein the expander provides an output of the expander function to said digital signal processor.

17. The method of claim 14, wherein the front-end comprises an I-channel and a Q-channel, and wherein a first compressor, expander and shifter are included in said I-channel and a second compressor, expander and shifter are included in said Q-channel.

18. The method of claim 13, wherein the front-end further comprises a shifter coupled between the analog-to-digital converter and the expander, wherein said shifter performs a left-shift operation on the digital signal provided by said analog-to-digital converter.

19. The method of claim 13, wherein the communication device further comprises a baseband amplifier operatively coupled to an input of the compressor, wherein said baseband amplifier amplifies the analog input signal provided to the compressor.

20. The method of claim 19, wherein the communication device further comprises an attenuator operatively coupled to an input of the baseband amplifier, wherein said attenuator attenuates the analog input signal provided to the baseband amplifier.

* * * * *